(No Model.) 2 Sheets—Sheet 1.
B. TOULOUSE & J. DELORIEUX.
OLIVE MILL.
No. 527,905. Patented Oct. 23, 1894.
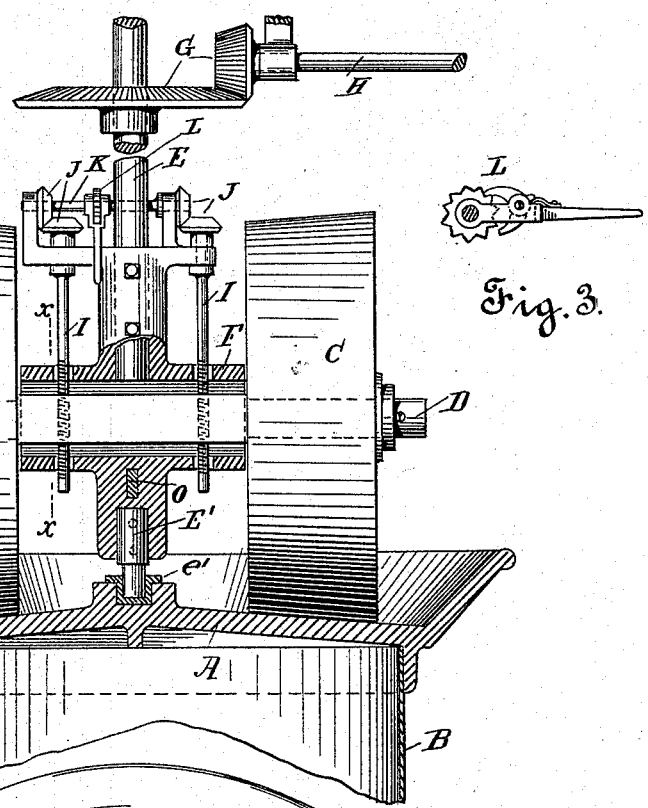
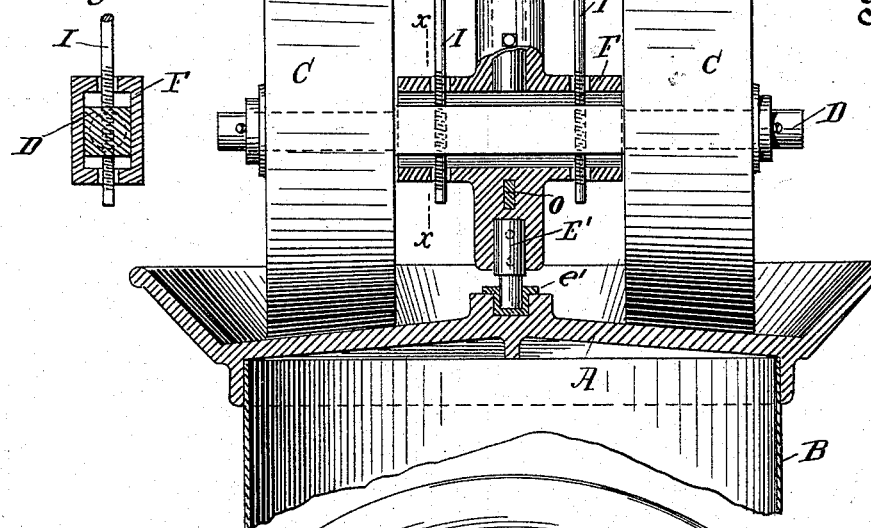
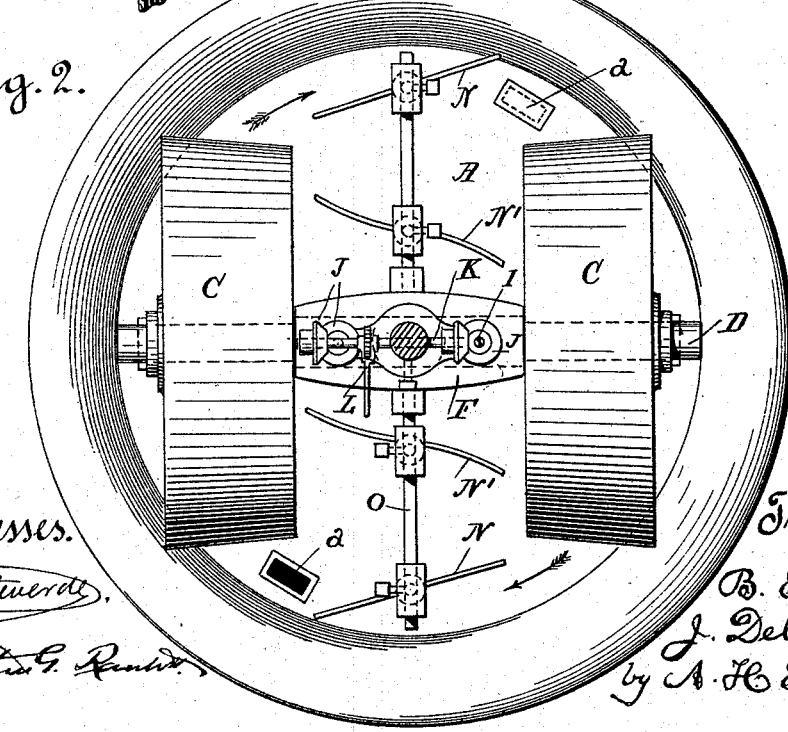
Witnesses.
Inventors
B. Toulouse
J. Delorieux
by A. H. Ste. Marie
atty (No Model.) 2 Sheets—Sheet 2.

B. TOULOUSE & J. DELORIEUX.
OLIVE MILL.

No. 527,905. Patented Oct. 23, 1894.

Witnesses.
F. Monteverde
Arthur G. Ranlett

Inventors,
B. Toulouse
J. Delorieux
by A. H. Ste Marie
atty

UNITED STATES PATENT OFFICE.

BERNARD TOULOUSE AND JOHN DELORIEUX, OF SAN FRANCISCO, CALIFORNIA.

OLIVE-MILL.

SPECIFICATION forming part of Letters Patent No. 527,905, dated October 23, 1894.

Application filed December 20, 1893. Serial No. 494,215. (No model.)

*To all whom it may concern:*

Be it known that we, BERNARD TOULOUSE and JOHN DELORIEUX, citizens of the United States, residing at San Francisco, in the county of San Francisco and State of California, have invented certain new and useful Improvements in and relating to Olive-Mills; and we do declare the following to be a full, clear, and exact description of the invention, such as will enable others skilled in the art to which it appertains to make and use the same, reference being had to the accompanying drawings, and to the letters of reference marked thereon, which form a part of this specification.

The object of our invention is to provide means whereby one may be enabled to crush olives without breaking the stone they contain and therefore insure the extraction of none but sweet oil from the crushed olives when afterward they are put into the press, it having been found that the breaking of the stone imparts to the oil contained in the flesh a bitter taste which renders it more or less unpalatable and consequently impairs its value as a marketable product. This object we attain by the mechanism illustrated in the accompanying drawings, in which—

Figure 5:
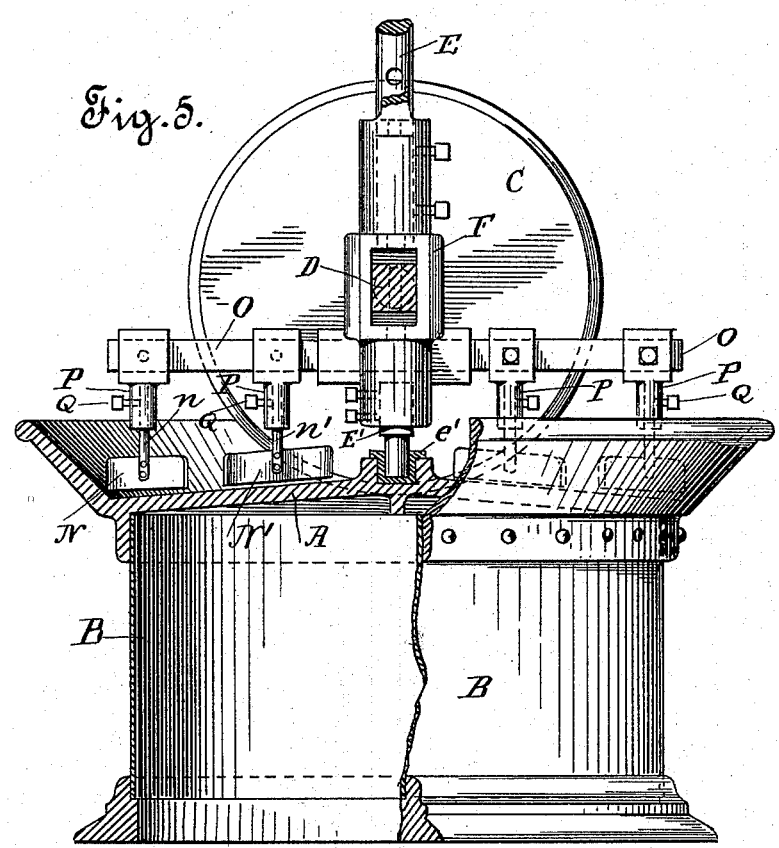
Figure 6:
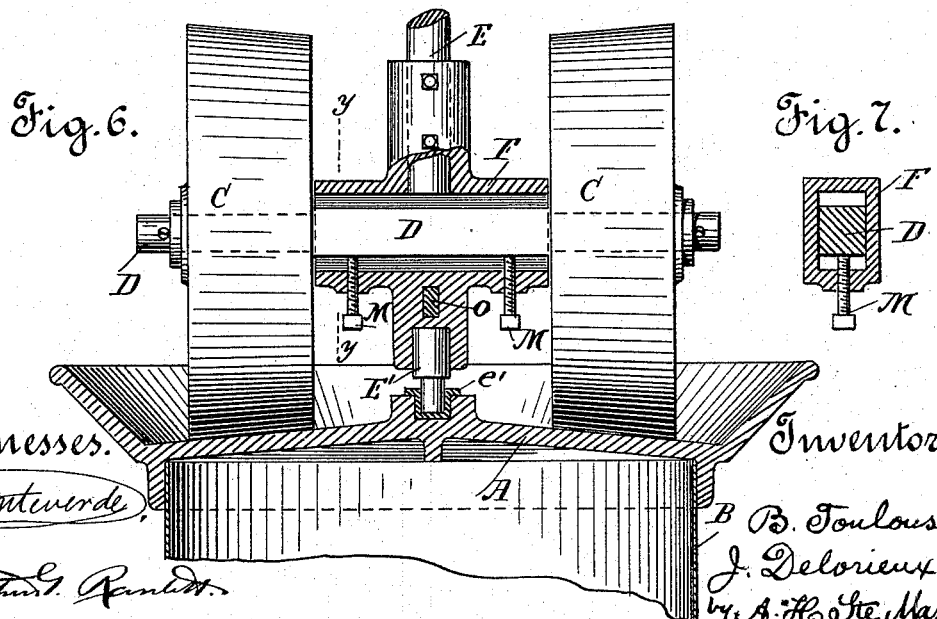
Figure 7:
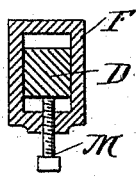

Figure 1 is a partly-broken sectional elevation of our mill, showing the preferred form of mechanism for adjusting the crushing devices. Fig. 2 is a plan of the same. Fig. 3 is a detailed view of a ratchet used for working the crusher-adjusting mechanism. Fig. 4 is a cross-section taken from the line $x\,x$ Fig. 1. Fig. 5 is also a broken sectional elevation, looking to one side of Fig. 1. Fig. 6 is a sectional elevation somewhat similar to Fig. 1, but showing a modification of our invention in so far as it relates to the means for adjusting the crushing devices. Fig. 7 is a cross-section taken from the line $y\,y$ Fig. 6.

Similar parts are indicated by similar letters of reference throughout all the views.

A represents the table upon which the olives are spread to be crushed and reduced to paste preparatory to being pressed. This table is preferably made of cast-iron and formed with a centrally-raised bottom and an upward border flange as shown at Figs. 1, 5 and 6. It is mounted upon a cylindrical sheet-iron box or casing B in the bottom of which are placed the various vessels that are to receive the paste resulting from the crushed olives. The paste is dropped into these vessels from the table above through holes or apertures $a$ provided for this purpose and which are normally kept covered.

C designates the crushing devices or stones, made in the form of rollers. These are also of cast-iron and slightly conical or tapering inwardly to conform to the incline of the table, around, upon and above which they are adapted to revolve in a vertical plane. They are mounted and turn on the ends of an axle D, which is square in the central part and revolves with them about a vertical axis coinciding with the center of the table. The vertical shaft about which the rollers C and their axle revolve is made in two parts E E' that are respectively secured to the top and bottom of a quadrangular box F in which is fitted the central square part of the axle. The lower part E' of the vertical shaft is stepped in a box $e'$ in the center of the table, forming a bearing for the crushing devices to turn on. The upper part E forms a portion of the actuating mechanism, being connected by bevel gears G to a driving shaft H that may be set in motion by either steam or horse power or any other prime mover.

It will be observed that the box F is higher than it is broad, and the axle D being square it can be raised or lowered therein to a certain extent and with it the stones or crushing rollers which it carries. This permits the adjustment of the rollers with relation to the table so that one may regulate the pressure that shall be exerted upon the material to be crushed. The raising of the axle and rollers may be effected in several ways, two of which are illustrated in the accompanying drawings. The preferred mode for persons not accustomed to the use of tools and machinery is that shown at Figs. 1 and 2, where the raising is accomplished by means of screws or screw-threaded rods I engaging internal threads in the axle D and connected by bevel-gears J to a small shaft K passing through the upper section of the vertical shaft E E' and adapted to be rotated by a double-pawl star ratchet L. The turning of the ratchet wheel in the required direction by working back and forth the lever carrying the double pawl is then all that is necessary to either raise or lower the axle and rollers thereon, both ends of the axle and both rollers being raised or lowered at the same time and in the same ratio. The raising mechanism shown in Figs. 6 and 7 is still simpler, but requires some care in handling in order to make sure that the ends of the axle and the rollers shall be kept constantly at the same height, that is raised or lowered, as the case may be, in always the same degree. As represented in these figures, it merely consists of screws M fitted in and passing through the under side of the box F and bearing against the under side of the axle D. To turn these screws right or left by means of a wrench is all that is required to either raise or lower the axle within the box and accordingly change the position of the crushing rollers. Only care must be taken to give the same number of turns to each screw to properly balance the axle and rollers.

N N' are scrapers that follow in the path of the crushing rollers as indicated by arrows in Fig. 2 and are provided, two on each side of the axle D, to stir up the olives as they are being crushed upon the table. These scrapers are carried by a bar O passing through the lower section of the vertical axis and have stems $n$ $n'$ adjustably secured in their sockets P by set-screws Q. They are arranged to take and gather up the olives crushed and displaced by the roller next preceding them and leave these olives in heaps or ridges for the following roller to ride upon. In this way the mass of olives is continually stirred up and every part of it is in time subjected to the action of the rollers. The scrapers being adjustable, they may be set in any convenient position that may be found most suitable for the purposes in view.

The operation is as follows: Part of the olives to be crushed are spread evenly on the table, say about fifty pounds in a mill of ordinary size. The rollers are then set to a height above the table corresponding to the thickness of the stone or pit of the biggest olive found in the lot, or better still, if the olives have been graded, to the average thickness of stone of the whole lot. The mill being set in motion, the rollers ride upon the spread olives, flatten and squeeze them down to the thickness of their pits, but without breaking the pits, and soon mash their flesh, which the pits help to tear off and reduce to paste on being rubbed one against the other while subjected to the action of the rollers and scrapers. Fresh olives are fed as the crushing progresses until about three hundred pounds have been spread upon the table, which is the normal capacity of the ordinary mill. The olives having been mashed to the proper consistency the apertures $a$ are uncovered and the crushed mass or paste, as it is called, is then allowed to drop into buckets placed inside the cylindrical casing upon which the table is mounted, being subjected all the while to the action of the rollers and carried away by the scrapers.

Having now described our invention, what we claim, and desire to secure by Letters Patent of the United States, is—

In an olive mill, the combination of a table, a vertical shaft mounted thereon and provided with a horizontal quadrangular box, an axle mounted in said quadrangular box and carrying crushing rollers at its ends, adjusting screws inserted vertically through the quadrangular box and passing through and engaging the axle, pinions on the upper ends of the said screws, a short horizontal shaft mounted on and carried by the vertical shaft, pinions on the ends of said shaft meshing with the pinions on the upper ends of the screws, and means for rotating said shaft whereby the screws will be turned and the axle adjusted vertically in the quadrangular box.

In testimony whereof we affix our signatures in presence of two witnesses.

B. TOULOUSE.
J. DELORIEUX.

Witnesses:
A. H. STE. MARIE,
CHAS. T. STANLEY.